US010620965B2

(12) United States Patent
Roszak et al.

(10) Patent No.: US 10,620,965 B2
(45) Date of Patent: Apr. 14, 2020

(54) INTERNET RECOVERY OF A WINDOWS CONFIGURATION

(71) Applicant: VMware, Inc., Palo Alto, CA (US)

(72) Inventors: Jason Roszak, Roswell, GA (US);
Craig Newell, Atlanta, GA (US);
Shravan Shantharam, Atlanta, GA (US); Varun Murthy, Atlanta, GA (US); Kalyan Regula, Alpharetta, GA (US); Blake Watts, St. George, UT (US)

(73) Assignee: VMware, Inc., Palo Alto, CA (US)

( * ) Notice: Subject to any disclaimer, the term of this patent is extended or adjusted under 35 U.S.C. 154(b) by 158 days.

(21) Appl. No.: 15/466,844

(22) Filed: Mar. 22, 2017

(65) Prior Publication Data
US 2018/0276003 A1    Sep. 27, 2018

(51) Int. Cl.
*G06F 9/44* (2018.01)
*G06F 9/445* (2018.01)
*G06F 11/14* (2006.01)
*G06F 9/4401* (2018.01)
*G06F 8/61* (2018.01)

(52) U.S. Cl.
CPC .............. *G06F 9/4416* (2013.01); *G06F 8/63* (2013.01); *G06F 9/4401* (2013.01); *G06F 9/4406* (2013.01); *G06F 11/1417* (2013.01)

(58) Field of Classification Search
None
See application file for complete search history.

(56) References Cited

U.S. PATENT DOCUMENTS

| 5,974,546 | A  | 10/1999 | Anderson |
| 6,112,246 | A  | 8/2000  | Horbal |
| 6,205,579 | B1 | 3/2001  | Southgate |
| 7,350,205 | B2 | 3/2008  | Alviso |
| 7,594,107 | B1 | 9/2009  | Parkhill |
| 7,836,337 | B1 | 11/2010 | Wu |
| 8,239,688 | B2 | 8/2012  | De Atley |

(Continued)

FOREIGN PATENT DOCUMENTS

KR    100646359    11/2006

OTHER PUBLICATIONS

International Search Report dated Jul. 24, 2018 for International Application No. PCT/US2018/023658.

(Continued)

*Primary Examiner* — Fahmida Rahman
(74) *Attorney, Agent, or Firm* — Clayton, McKay & Bailey, PC

(57) ABSTRACT

Systems and methods are included for causing a computing device to assemble and boot from a managed operating system. When the computing device is powered on, it can execute firmware that specifies a server to contact. The server can identify a base operating system (OS) image to boot, and the location of a pre-enrollment installer for installing the base OS image. The pre-enrollment installer can download the base OS image in one or more pieces from multiple locations. This can include base OS images related to enterprise management and company-specific applications and drivers. Once the pre-enrollment OS has combined the base OS images, the computing device reboots using the combined image.

20 Claims, 9 Drawing Sheets

(56) References Cited

U.S. PATENT DOCUMENTS

| | | | |
|---|---|---|---|
| 8,332,496 B2 * | 12/2012 | Gopalakrishnan | G06F 9/4416 709/222 |
| 8,555,273 B1 | 10/2013 | Chia | |
| 8,578,361 B2 | 11/2013 | Cassapakis | |
| 8,838,754 B1 | 9/2014 | Rao | |
| 8,886,964 B1 | 11/2014 | Tonkinson | |
| 9,112,749 B2 | 8/2015 | Dabbiere | |
| 9,176,752 B1 | 11/2015 | Marr | |
| 9,185,099 B2 | 11/2015 | Brannon | |
| 9,507,581 B2 | 11/2016 | Butcher | |
| 9,529,602 B1 | 12/2016 | Swierk | |
| 9,846,584 B1 | 12/2017 | Khoruzhenko | |
| 9,904,557 B2 | 2/2018 | Buhler | |
| 10,044,695 B1 | 8/2018 | Cahill | |
| 2001/0047514 A1 | 11/2001 | Goto | |
| 2003/0014619 A1 | 1/2003 | Cheston | |
| 2003/0097433 A1 | 5/2003 | Park | |
| 2003/0115091 A1 | 6/2003 | Sawyer | |
| 2003/0140223 A1 | 7/2003 | Desideri | |
| 2004/0210362 A1 | 10/2004 | Larson | |
| 2005/0149729 A1 | 7/2005 | Zimmer | |
| 2005/0198487 A1 | 9/2005 | Zimmer | |
| 2005/0204353 A1 | 9/2005 | Alviso | |
| 2006/0200539 A1 | 9/2006 | Kappler | |
| 2007/0133567 A1 | 6/2007 | West | |
| 2007/0260868 A1 | 11/2007 | Azzarello | |
| 2008/0046708 A1 * | 2/2008 | Fitzgerald | G06F 8/63 713/2 |
| 2008/0126921 A1 | 5/2008 | Chen | |
| 2009/0198805 A1 | 8/2009 | Ben-Shaul | |
| 2011/0099547 A1 | 4/2011 | Banga | |
| 2011/0173598 A1 | 7/2011 | Cassapakis | |
| 2011/0178886 A1 | 7/2011 | O'Connor | |
| 2011/0191765 A1 | 8/2011 | Lo | |
| 2011/0197051 A1 | 8/2011 | Mullin | |
| 2012/0233299 A1 | 9/2012 | Attanasio | |
| 2012/0265690 A1 | 10/2012 | Bishop | |
| 2013/0212278 A1 | 8/2013 | Marshall | |
| 2013/0212650 A1 | 8/2013 | Dabbiere | |
| 2013/0283047 A1 | 10/2013 | Merrien | |
| 2013/0339718 A1 | 12/2013 | Kanaya | |
| 2013/0346757 A1 | 12/2013 | Nick | |
| 2014/0040605 A1 | 2/2014 | Futral | |
| 2014/0109194 A1 | 4/2014 | Manton | |
| 2014/0235203 A1 | 8/2014 | Gonsalves | |
| 2014/0237236 A1 | 8/2014 | Kalinichenko | |
| 2014/0244989 A1 | 8/2014 | Hiltgen | |
| 2014/0280934 A1 | 9/2014 | Reagan | |
| 2014/0282815 A1 | 9/2014 | Cockrell | |
| 2014/0282894 A1 | 9/2014 | Manton | |
| 2015/0056955 A1 | 2/2015 | Seleznyov | |
| 2015/0067311 A1 | 3/2015 | Forristal | |
| 2015/0074387 A1 | 3/2015 | Lewis | |
| 2015/0089209 A1 | 3/2015 | Jacobs | |
| 2015/0143508 A1 | 5/2015 | Halibard | |
| 2015/0154032 A1 | 6/2015 | Chen | |
| 2015/0237498 A1 | 8/2015 | Freedman | |
| 2015/0296368 A1 | 10/2015 | Kaufman | |
| 2016/0006604 A1 | 1/2016 | Freimark | |
| 2016/0043869 A1 | 2/2016 | Smith | |
| 2016/0065557 A1 | 3/2016 | Hwang | |
| 2016/0087955 A1 | 3/2016 | Mohamad Abdul | |
| 2016/0132310 A1 | 5/2016 | Koushik | |
| 2016/0180094 A1 | 6/2016 | Dasar | |
| 2016/0188307 A1 | 6/2016 | Reagan | |
| 2016/0196432 A1 | 7/2016 | Main | |
| 2016/0231804 A1 | 8/2016 | Bulusu | |
| 2016/0266888 A1 | 9/2016 | Nieves | |
| 2016/0364243 A1 | 12/2016 | Puthillathe | |
| 2017/0140151 A1 | 5/2017 | Nelson | |
| 2017/0235928 A1 | 8/2017 | Desai | |
| 2017/0308706 A1 | 10/2017 | Ray | |
| 2018/0054354 A1 | 2/2018 | Wienstroer | |
| 2018/0075242 A1 | 3/2018 | Khatri | |
| 2018/0136946 A1 | 5/2018 | El-Haj-Mahmoud | |
| 2018/0276002 A1 | 9/2018 | Roszak | |

OTHER PUBLICATIONS

International Search Report dated Jul. 24, 2018 for International Application No. PCT/US2018/023657.
International Search Report Written Opinion dated Jul. 9, 2018 for PCT/US2018/023654.
"Microsoft", ("Windows Platform Binary Table (WPBT)", Jul. 9, 2015, (12 pages) (Year: 2015).
International Search Report dated Jun. 21, 2019 for Application No. PCT/US2018/052273.
International Search Report dated Apr. 8, 2016 for Application No. PCT/US2015/066903.

* cited by examiner

INTERNET RECOVERY OF A WINDOWS CONFIGURATION

CROSS REFERENCE TO RELATED APPLICATIONS

This application is one of five related applications filed on Mar. 22, 2017. The following applications are incorporated by reference in their entireties: application Ser. No. 15/466,830, entitled "Persistent Enrollment of a Computing Device Using a BIOS," filed Mar. 22, 2017; application Ser. No. 15/466,835, entitled "Persistent Enrollment of a Computing Device Using Vendor Autodiscovery," filed Mar. 22, 2017; application Ser. No. 15/466,837, entitled "Persistent Enrollment of a Computing Device Based on a Temporary User," filed Mar. 22, 2017; and application Ser. No. 15/466,841 entitled "Configuring a Computing Device Using Managed Operating System Images," filed Mar. 22, 2017.

BACKGROUND

Enterprises often provide employees with corporate-owned computing devices, such as laptops, tablets, cell phones, and personal computers. These computing devices typically require an initial setup before being given to an employee. For example, an administrator may need to install a specific operating system and applications on the device. The administrator can also take steps to enroll the computing device with an Enterprise Mobility Management ("EMM") system before handing the device over to an employee. Without enrollment software installed on the computing device, the device would not be secure and an employee could lose or steal the device and any information on it. Installing the correct software, hardware, drivers, and configurations can be done as part of a device enrollment program ("DEP").

APPLE has its own DEP for its computing devices. Because APPLE provides its own software and hardware with its computing devices, they are able to easily enroll computing devices. This allows them to track device owners and configurations. However, there is no way for administrators to easily do this for WINDOWS devices or other personal computer ("PC") devices. Each PC device can include a different combination of hardware and software from multiple vendors. There is no central entity or repository that tracks ownership and configuration information, unlike in the APPLE ecosystem.

As a result, administrators do not know how to boot PC devices into a known golden image. The golden image only works when the device hardware and configurations are the same, which is unlikely in the PC ecosystem. A clean state requires an administrator to wipe each computing device and re-image it. Every time a user installs a new application, an administrator must create another golden image that it can use to re-flash the device. Repeating this for every department and enterprise division (human resources, sales, etc.) becomes time-consuming.

Additionally, outside of the APPLE ecosystem, there is no easy way for an original equipment manufacturer ("OEM") device supplier (also called a vendor) to load a custom company image onto user devices at the time they ship from the OEM. The user device configurations constantly evolve and it is impractical for an OEM to track the evolution. Therefore, the cumbersome task of individual user device setup falls to the enterprise. Multiplied by the number of employees in a workforce, the initial setup can be a major drain on company resources. These setup steps are repeated when a computing device malfunctions or is assigned to a new employee, or when an employee upgrades to a new device. Therefore, large organizations require additional IT manpower for provisioning employee devices, increasing the organization's overall costs. The setup process also produces delays in providing employees with new computing devices, which lowers the overall efficiency of the company's workforce.

Enterprises wishing to enroll the computing device into an EMM system must further manually configure each device. It generally is not feasible for the OEM to customize its operating system ("OS") image to include management features of the EMM system. This is because EMM functionality can vary, even between different employees in the same EMM system. EMM software is constantly changing, and expecting an OEM manufacturer to replace its OS image with each change would be unrealistic. Therefore, individual device configuration is currently required.

This can require user login into an OS prior to enrollment in the EMM. This gives a user opportunity to circumvent management policies, which are not yet installed in the non-enrolled device.

Trusted boot processes are also very fragmented across different providers of PC devices. Secure boot is one such process supported by WINDOWS, using hash encryption to ensure a secure version of WINDOWS with a particular BIOS version is loaded on the computing device. Each provider can attempt to specify the BIOS and software versions. In the PC ecosystem, there is no single trusted source to cause computing devices to boot with the right OS and software configurations for different enterprises or groups.

For similar reasons, device ownership is equally impossible to track. Each OEM hardware supplier (LENOVO, DELL, etc.) has different standards and sells through different channels, such as direct to enterprises and through stores like BEST BUY. There is no current way to track who bought the device from whom, who owns it, or configuration details after purchase. This is different from the APPLE ecosystem, where there is generally only one source for the computing devices. With a single source, device ownership can be reconstructed from a serial number and a receipt.

In the fragmented PC ecosystem, recovering PC device configurations is also very difficult. Without the ownership or configuration details, it is generally not possible to provide a clean version of the OS, installed software, and drivers. Therefore, Internet recovery has been non-existent for PC devices up to this point.

Consequently, a need exists for a system that provides trusted factory images to load onto user devices running WINDOWS and other non-APPLE operating systems. A need exists for a system where the trusted factory images are customized for different device owners to ensure correct configuration and EMM operation while bypassing piece-meal administrator setup.

SUMMARY

Examples described herein include systems and methods for providing persistent enrollment for a computing device, including automatic enrollment upon first boot-up of the device. The terms "computing device," "user device," and "mobile device" are used interchangeably throughout and can encompass any type of computing device, such as laptops, tablets, cell phones, and personal computers.

An example system allows a computing device to install a managed WINDOWS OS configured according to ownership details. In one example, a computing device, such as a laptop, is powered on. It could be a new computing device powered on for the first time, or it could be a used computing device powered on after OS deletion or corruption. On startup, a BIOS process can execute. As part of that, a factory bit in the BIOS can direct the computing device to contact a vendor server. The vendor server can be part of a factory server or a management server, or it can be a stand-alone server, in an example.

A network stack within the firmware of the computing device can query the vendor server to determine if the computing device is to be enrolled into a mobile device management ("MDM") system. If so, the response can indicate a particular management server to contact. For example, the vendor server can supply an address, such as a URL. The URL can point to a pre-enrollment installer, which can act as a mini operating system for gathering one or more OS images. The pre-enrollment installer can be a WINDOWS PE image.

The firmware on the computing device can proceed to download the pre-enrollment installer. When the pre-enrollment installer executes, it can connect to a discovery service to determine ownership information for the computing device. The discovery service can be part of the management server in one example.

The discovery service can return a response indicating a tenant that owns the laptop and an address (such as a URL) to use for querying the tenant. The tenant can correspond to, for example, a company, enterprise, or a group within the enterprise. Specifically, the address can be used to query the tenant regarding OS image details, which can be used to determine which OS images to install. In another example, the discovery service can store the OS image details locally, obviating the need to query the tenant.

The pre-enrollment installer queries the tenant at the address. This can include contacting a company server at the address. The company server can return OS image details. The OS image details can specify specific OS images to install, such as "BigWare.wim." If the required OS images do not exist on the computing device, the pre-enrollment installer can proceed to download the compliant OS images, such as from the management server. Alternatively, the OS image details can include parameters around which the management server or pre-enrollment installer can select compliant OS images. For example, the parameters can specify an OS version, a MDM system version, and particular applications for installation. One possible parameter would be for the most recent OS and MDM versions.

The tenant's OS images can be self-hosted at the company server in one example. Alternatively, the management server or another third party server can host the OS images.

A management OS image file, such as AIRWATCH.WIM, can also be downloaded to allow the device to function properly in an MDM system. This can be downloaded from the management server in one example.

Once all the required OS images are downloaded, the firmware can extract the images to a local storage partition. This can include the management OS image, which can be overlaid onto the final extracted image. This can include splicing or injecting the image over the top of a WINDOWS base installation image. The enrollment components can take effect during normal WINDOWS installation, causing the appropriate management policies to be downloaded and enforced on the computing device.

The pre-boot enroller or firmware can reboot the machine, leading to normal WINDOWS setup and device enrollment.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

In one example, a system allows a computing device to determine what combination of OS images will result in a clean final OS that the computing device can boot. The system can be used prior to initial boot. It can also be used later for Internet recovery, to restore a computing device to a clean state after something has gone wrong. Previously, this has been very difficult to do outside of the APPLE ecosystem. An example system builds a final OS image based on one or more companies, OEMs, and an MDM provider that all can have device-specific software and drivers running on the computing device when the device is in a clean state.

In an example, firmware on the computing device is flashed at a manufacturer to enable the computing device to assemble an OS image prior to booting an OS. The computing device can use a network stack in its firmware to check with a vendor server. The vendor server is contacted at an address that is supplied in the firmware. The vendor server can store or retrieve ownership or management status associated with a device identifier. If the computing device is indicated as managed, it can contact a management server at an address specified by the vendor server. The computing device can download a pre-enrollment installer from the management server. The pre-enrollment installer assists with locating and combining OS images, and can act as a mini-OS during that time.

The pre-enrollment installer can request ownership information from the management server. In response, the management server can provide a second address for contacting a company server associated with the device owner. The computing device can download an OS image from the company server, or simply receive OS image details for use in downloading an OS image from a different location. If the specified OS image does not exist locally, it can be downloaded. In another example, the management agent and company servers can be the same servers using a single address.

Building a final OS image prior to booting or requiring an existing OS can ensure proper recovery or initial installation. This is particularly true in the MDM context, where management policies appropriate to the particular computing device can be implemented without requiring the OS to load first.

Figure 1A:
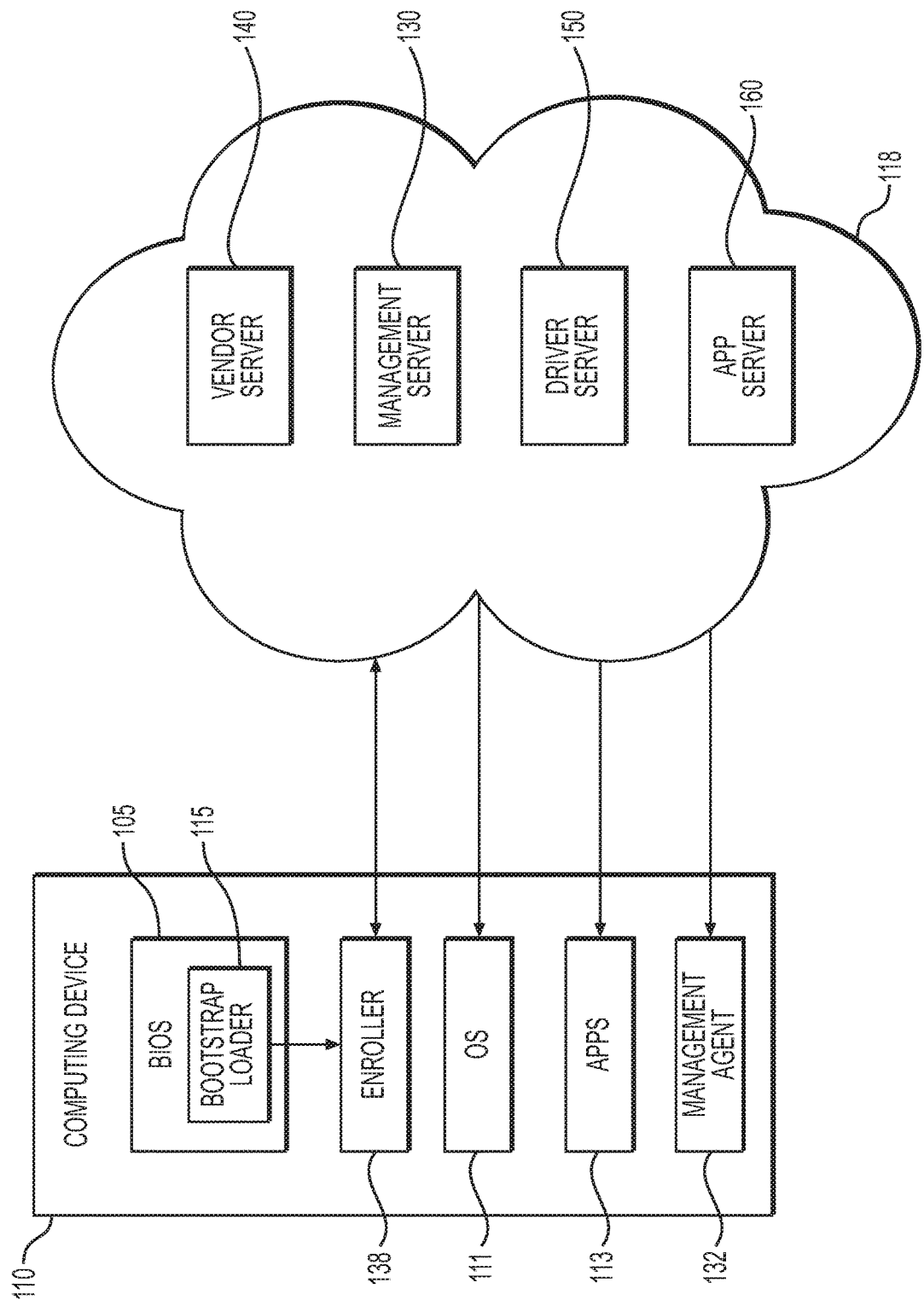
FIG. 1A is an exemplary illustration of system components for persistent enrollment of a computing device.

Turning to FIG. 1A, exemplary system components are illustrated. A computing device 110 can include firmware 105 that includes a bootstrap loader 115. The computing device 110 can be any processor-based device, such as a smartphone, laptop, tablet, personal computer, or workstation. It can be flashed with firmware 105, which can include a BIOS.

When the computing device 110 powers on, it can read the firmware 105 to initialize the boot process. This can include loading an OS 111. The OS 111 can be a WINDOWS operating system. The OS 111 can exist locally and be referenced by the firmware 105 in an example. For example, a drive partition in the computing device 110 can store a copy of the OS, which can be called an OS image.

The firmware 105 can also include a bootstrap loader 115 for device configuration and management purposes. Because firmware 105 space is limited, the bootstrap loader 115 can include enough code to launch an enroller 138 that reaches out over a network 118 for more assistance. The network 118 can be one or more of the Internet, a local network, a private network, or an enterprise network.

The enroller 138 can be responsible for installing applications and enrolling the computing device 110 with a management server 130. It can do so prior to the OS 111 allowing a user to log in. In one example, the enroller 138 blocks login by pausing one or more OS processes until enrollment, installation, and policy synchronization is complete. The enroller 138 can perform various software-based steps, such as connecting to external servers and pausing ongoing processes. The enroller 138 can operate in a parallel process to the operating system 111, such that it is independent from the operating system 111.

The firmware 105 can identify a management agent 132 in one example. This can be based on a flag or information in the WPBT. For example, the enroller 138 can download the management agent 132 from an address indicated by the flag or WPBT. Alternatively, the firmware 105 can include a copy of the management agent 132 or reference a local copy in a drive partition.

The bootstrap loader 115 or enroller 138 can initially wait for an operating system 111 application programming interface ("API") to become available. In the case of a WINDOWS operating system 111, for example, the bootstrap loader 115 can wait for one or more of the APIs in the WINDOWS API—the core set of APIs available within the WINDOWS operating system 111. In one example, the bootstrap loader 115 waits for the Win32 Subsystem API to become available.

In one example, the enroller 138 can download an updated version of itself from the management server 130. This can allow for more complex enrollment functionality than provided in the firmware 105. The enroller 138 can be updated to work with a particular version of an OS, or to include additional functions, network addresses, or server logins that are subject to change.

In one example, the firmware 105 can include a flag that causes the enroller 138 to communicate with a vendor server 140. The vendor server 140 can be associated with a manufacturer or supplier of the computing device 110. The vendor server 140 can determine whether the computing device 110 is supposed to be managed. If so, it can supply contact information for the appropriate management server 130.

When the vendor server 140 determines that the computing device 110 is managed by management server 130, it can provide an address for contacting the management server 130. This can allow the enroller 130 to download policy information. Policy information can include compliance rules and other limitations on device functionality. The policy information can differ between tenants, allowing the management server 130 to pick initial policy information based on the tenant associated with the computing device 110.

The policies provided can be based on ownership information associated with the computing device 110. The ownership information can be stored by either the vendor server 140 or management server 130, depending on the example. The server 130, 140 can track which computing devices 110 are supplied to which tenants. A tenant can be an owner, such as a corporation. Alternatively, it can be a group or division within a corporation. Groups can be used to apply different management policies to different devices, depending on the group.

In one example, the computing device 110 can request the ownership information from the management server 130. Ownership information can be keyed on device identifiers, such as serial numbers. An administrator can load ownership information into a server 130, 140 based on bulk orders or invoices. The management server 130 can use the ownership information to point the computing device 110 to drivers, applications, or OS images to install, which can be located at the management server 130 or on separate servers 150, 160 accessible over the network 118.

The management server 130 can control one or more managed applications 113 through interaction with the management agent 132 on the user device 110. The management agent 132 can be an application 113 or part of an operating system 111. In one example, the management agent 132 can be installed when the user device 110 enrolls with the management server 130. The management server 130 can be part of an EMM system. The management server 130 can dictate which managed applications 132 are installed, such as based on which tenant the computing device 110 belongs to. Similarly, specific functionality within the managed applications 113 can be enabled or disabled by the management server 130.

The management server 130 or vendor server 140 can supply additional addresses for driver servers 150 or application servers 160. This can allow the enroller 138 to contact these servers 150, 160 over network 118 and install device-specific or tenant-specific applications 113 and drivers. In one example, this can be performed prior to the enroller 138 unblocking login into the operating system 111. This can ensure that the appropriate drivers and applications 113 are on the computing device 110 before the user can access the operating system 111. This can mitigate chances of a user circumventing management policies.

In one example, rather than downloading individual drivers and applications, these components can be downloaded as part of OS images in one example. An OS image including the management agent can also be downloaded from the management server 130. A process initiated by firmware can assemble the OS images into a combined OS image. Then, the firmware can reboot the computing device using the combined OS image.

The servers 130, 140, 150, and 160 can each include one or more servers or processors. Alternatively, multiple servers 130, 140, 150, and 160 can be combined into a single server or set of servers. For example, the vendor server 140 indicated in the firmware can actually be the same as the management server 130, in an example. The fact that they are illustrated separately in FIG. 1A is non-limiting.

Figure 1B:
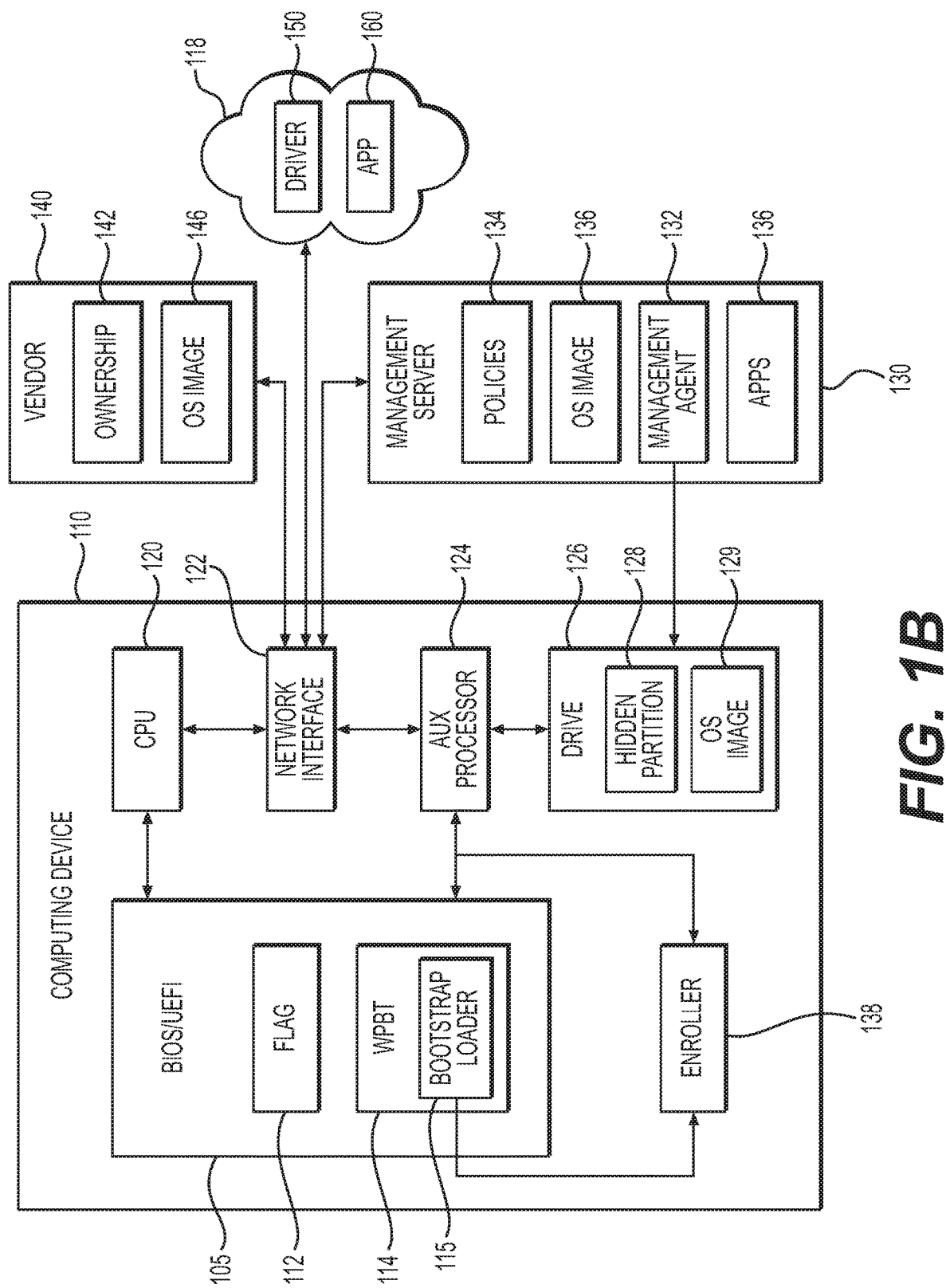
FIG. 1B is a more detailed exemplary illustration of system components for persistent enrollment of a computing device.

Turning to FIG. 1B, more exemplary system components are illustrated. The computing device 110 includes multiple processors, including a central processing unit ("CPU") 120 and an auxiliary processor 124. The enroller 138 can use the auxiliary processor 124 for pre-boot processes when the CPU 120 has not yet been enabled.

Additionally, the computing device 110 can include a drive 126, such as a hard disk drive or a solid state drive. The drive 126 can include a hidden partition 128. The hidden partition 128 can include an OS image 129. The OS image 129 can be executed to load the operating system 111, in an example.

Additionally, FIG. 1B shows that the firmware 105 can include a flag 112 that causes the computing device 110 to contact the vendor server 140, management server 130, or both, during boot. To do so, the enroller 138 can wait for a network interface 122 to activate. For example, the Win32 Subsystem can turn on the network interface 122. The firmware 105 can contain requisite drivers in one example. For example, a network stack in the firmware 105 can activate the network interface 122. Alternatively, the drivers can be loaded as part of the OS image 129 or independently stored on the drive 126.

The flag 112 or WPBT 114 can initiate persistent enrollment in one example. The contents of the WPBT 114 can execute on initial boot, causing a bootstrap loader 115 in the WPBT to launch an enroller 138. The WPBT 114 is a fixed Advanced Configuration and Power Interface ("ACPI") table that the BIOS or UEFI interface can provide to the operating system 111. The firmware 105 can provide this to the operating system 111 without modifying the WINDOWS image stored on the computing device 110 (if one exists). Therefore, regardless of any changes to the operating system 111 of the computing device 110, the WPBT 114 survives intact and is always present before the operating system 111 is loaded.

The location of the WPBT 114 is described in the Root System Description Table or Extended System Description Table ("RSDT/XSDT"). The RSDT/XSDT is an ACPI table that contains an array describing the physical addresses of all other ACPI tables. During initialization of the operating system 111, WINDOWS can parse the RSDT/XSDT table to obtain the location of the other ACPI tables, such as the WPBT 114. WINDOWS can copy the contents of an ACPI table into operating system memory and execute it as desired.

This can allow boot processes, such as the bootstrap loader 115, to add management functionality to a generic version of WINDOWS during the initial boot. In one example, a copy of WINDOWS already resident on the computing device 110 begins to load. A BIOS flag 112 can be set to enable WPBT 114. Based on the BIOS flag 112 being set, the auxiliary processor 124 can access the WPBT 114, where it locates the bootstrap loader 115. The bootstrap loader 115 can initiate a process called the enroller 138, which can execute outside of the firmware 105. The enroller 138 can be responsible for altering a generic WINDOWS OS 111 to apply management policies 134 and other functionality needed to operate in a MDM system.

In an example, the WPBT 114 is accessed on the first boot of the computing device 110. This can be based on a BIOS flag 112 being set, or based on the WINDOWS OS image 129 being hardcoded to check the WPBT 114. For example, SmpExecuteCommand can be coded to check the WPBT 114. This allows the enrollment process to initiate and management policies 134 to be implemented prior to the user ever logging into the operating system 111. This is different than prior uses of the WPBT, such as COMPUTRACE, which do not utilize the WPBT on first boot.

As an example, the enroller 138 can retrieve an address from the firmware 105. The address can be coded into the enroller 138 based on the bootstrap loader 115, in one example. The address can also be at a location in the WPBT 114 or elsewhere in the firmware 105.

Alternatively, the flag 112 can indicate the address. In one example, a functioning WINDOWS OS 111 need not be present on the device for the flag 112 to initiate enrollment. The address can correspond to a vendor server 140 or a management server 130. When contacted by the enroller 138, the vendor server 140 can use a device identifier received from the computing device 110 to determine management status or device ownership 142. In another example, device ownership is tracked at the management server 130. Either server 130 or 140 can maintain a table of device serial numbers mapped to tenant information. The tenant information can include a second address for a tenant (such as an owner) of the computing device 110.

In one example, the vendor server 140 can send an address of the management server to the enroller 138. Using the address, the enroller 138 can contact the management server 130. This management server 130 can determine the tenant(s) associated with the computing device 110 (and also confirm that the computing device 110 is to be managed) based on a device identifier, such as serial number. Then the appropriate policies 134 can be applied to the computing device 110.

Although the user is still unknown, the management server 130 can determine applicable policies 134 based on the tenant. A tenant can be an enterprise or a group within an enterprise. Different groups (one example of a tenant) can be used by the management server 130 to apply policies 134, such as compliance rules, to computing devices 110 associated with the group. A group can correspond to a structure or hierarchy of a business or enterprise. For example, an enterprise can have various groups such as an engineering team, an accounting team, and a marketing team. Each of these teams can correspond to a different group stored on the management server 130.

The policies 134 can also include compliance rules. A compliance rule can set forth one or more conditions that must be satisfied in order for a computing device 110 to be deemed compliant. If compliance is broken, the management server 130 can take steps to control access of the user device 110 to enterprise files, applications, and email. Compliance rules can be assigned differently to the different organizational groups. For example, a developer group can be assigned different compliance rules than an executive group. The executive group might be allowed to install different applications than the development group. Similarly, the management server 130 can assign different compliance rules based on the different location-based organizational groups.

The management agent 132 and policies 134 can be downloaded to the user device 110. The management server 130 can also supply managed apps 136 for installation at the computing device 110, according to policies 134 that apply to that computing device 110.

The entire management agent 132 need not be downloaded in some examples. For example, the firmware 105 can be flashed to contain a copy of the management agent 132. This can allow the computing device 110 to inject the management agent 132 into the operating system 111 during boot. In another example, the OS image 129 provided on the computing device 110 contains the management agent 132. In yet another example, the hidden partition 128 of the drive 126 on the computing device 110 contains the management agent 132. In still another example, the management agent 132 that is downloaded comprises settings for an existing management agent 132 that is part of WINDOWS.

In still another example, the operating system 111 is comprised of multiple OS images 129, 146, and 136 that are combined for installation. The management server 130 or vendor server 140 can provide a pre-enrollment installer that acts like the enroller 138 but is used to download and assemble the OS images 129. The server(s) 130 and 140 can also provide multiple addresses for downloading the OS images 129, 136, 146. Other third party servers can provide additional drivers 150, apps 160, or OS images containing drivers 150 and apps 160.

Figure 2:
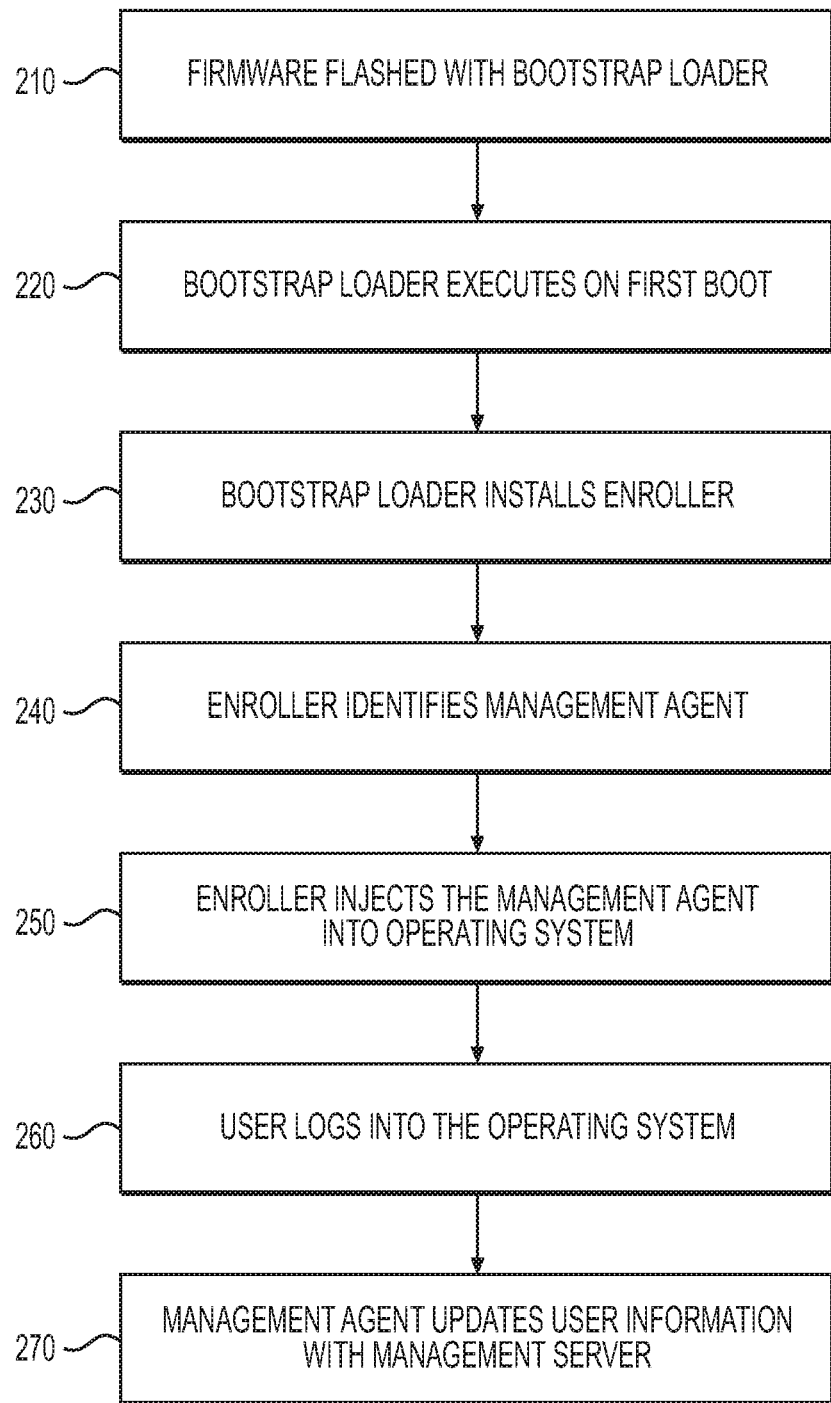
FIG. 2 is a flowchart of an exemplary method for BIOS installation of a management agent prior to user access to an operating system.

Turning to FIG. 2, example stages for using firmware to install a management agent on the first boot are shown. At stage 210, the firmware 105 of the computing device 110 is flashed to include a bootstrap loader 115. This can be done by a manufacturer. In one example, a vendor (which can include a manufacturer) can include a bootstrap loader 115 in the firmware 105. The bootstrap loader 115 can be configured to look for code in a hidden partition 128. For example, a special OS image 129 with a management agent 132 and management policies 134 could be accessed.

In another example, the firmware 105 can allow for persistent enrollment or Internet recovery of multiple tenants that use different OS images, applications, and management policies. In this example, a flag 112 or other bits in the firmware 105 can be set to cause the computing device 110 to contact the vendor server 140 (or management server 130). This can allow the server 130 or 140 to track device ownership separately, and supply the management policies 134 and applications 136 that correspond to the tenant.

At stage 220, when the device is powered on, a bootstrap loader 115 executes. The bootstrap loader 115 can execute based on a flag 112. This can occur on first boot and on subsequent boots. The flag 112 can be flashed in firmware 105 by the manufacturer. In one example, the flag 112 can reside in the WPBT 114 or point the processor to check the WPBT 114 on boot. In an example, the WPBT 114 is accessed on the first boot based on a BIOS flag 112 being set, or based on the WINDOWS OS image 129 being hardcoded to check the WPBT 114. For example, SmpExecuteCommand can be coded to check the WPBT 114. However, special versions of WINDOWS are not necessary in some examples. Instead, the BIOS flag 112 and WPBT 114 can initiate the process of customizing the standard operating system 111 to include the management functionality.

The bootstrap loader 115 can install and execute the enroller 138 at stage 230. The enroller 138 can retrieve additional resources from over the network 118. For example, it can be pre-coded to call an address associated with the vendor server 140 or management server 130.

At stage 240, the management agent 132 is identified. In one example, a flag 112 causes the enroller 138 to retrieve a management agent 132 from the WPBT 114. In another example, the enroller 138 can download the management agent 132 and management policy information 134. For example, the enroller 138 can wait for network access and then contact a server 130, 140. The server 130, 140 can check ownership information 142 associated with the computing device 110. For example, server 130, 140 can receive an identifier, such as a serial number or service tag, from the computing device 110. The serial number can be individually flashed into the BIOS 105 in an example. The server 130, 140 then checks the ownership information 142 to see whether the computing device 110 or a tenant associated with the computing device 110 is managed.

In one example, the vendor server 140 provides the enroller 138 with an address of the management server 130, based on determining that the computing device 110 is a managed device. The enroller 138 can contact the management server 130 and implement management policies 134 prior to the user ever logging into the operating system 111. Alternatively, the server 130, 140 can send the management agent 132 to the computing device 110 without supplying the additional address.

This can all occur on initial boot, before WINDOWS completely loads. This helps minimize the chances of managed configurations being circumvented.

At stage 250, the enroller 138 can inject the management agent 132 into the operating system 111. In one example, the enroller 138 accesses an operating system 111 API. The management agent 132 can implement various methods prior to the operating system 111 fully loading. The enroller 138 can also perform an enrollment process with the management server 130, during which time the appropriate management policies 134 are implemented at the computing device 110. The enroller 138 can also pause loading of the operating system 111 to allow for these processes to complete before allowing the user to login to the operating system 111.

In another example, the computing device 110 can download an OS image 136 that includes the management agent 132. The OS image 136 can be a partial image of the overall file system that makes up the operating system 111. The OS image 136 can already include the management agent 132 integrated into management features of the operating system 111. The management OS image 136 can be combined with another OS image 129 to create the full modified operating system 111. Then the enroller 138 can cause the computing device 110 to reload the modified operating system 111, effectively injecting the management agent 132 into the operating system 111 at stage 250.

During enrollment, the enroller 138 can pause one or more binaries that execute as part of the operating system 111 startup. Multiple binaries must complete in sequence for the operating system 111 to load successfully. By pausing one or more of them, the user will not be presented with a login screen.

After management policies 134 are in place, the enroller 138 can un-block the login process. At stage 260, the user can log into the operating system 111. In one example, the operating system 111 can present a series of screens designed to collect user information for completing enrollment at the management server 130. The management agent 132 can collect user inputs (such as login information) and send those inputs to the management server 130 at stage 270. The management server 130 can then associate the device enrollment with the user.

Figure 3:
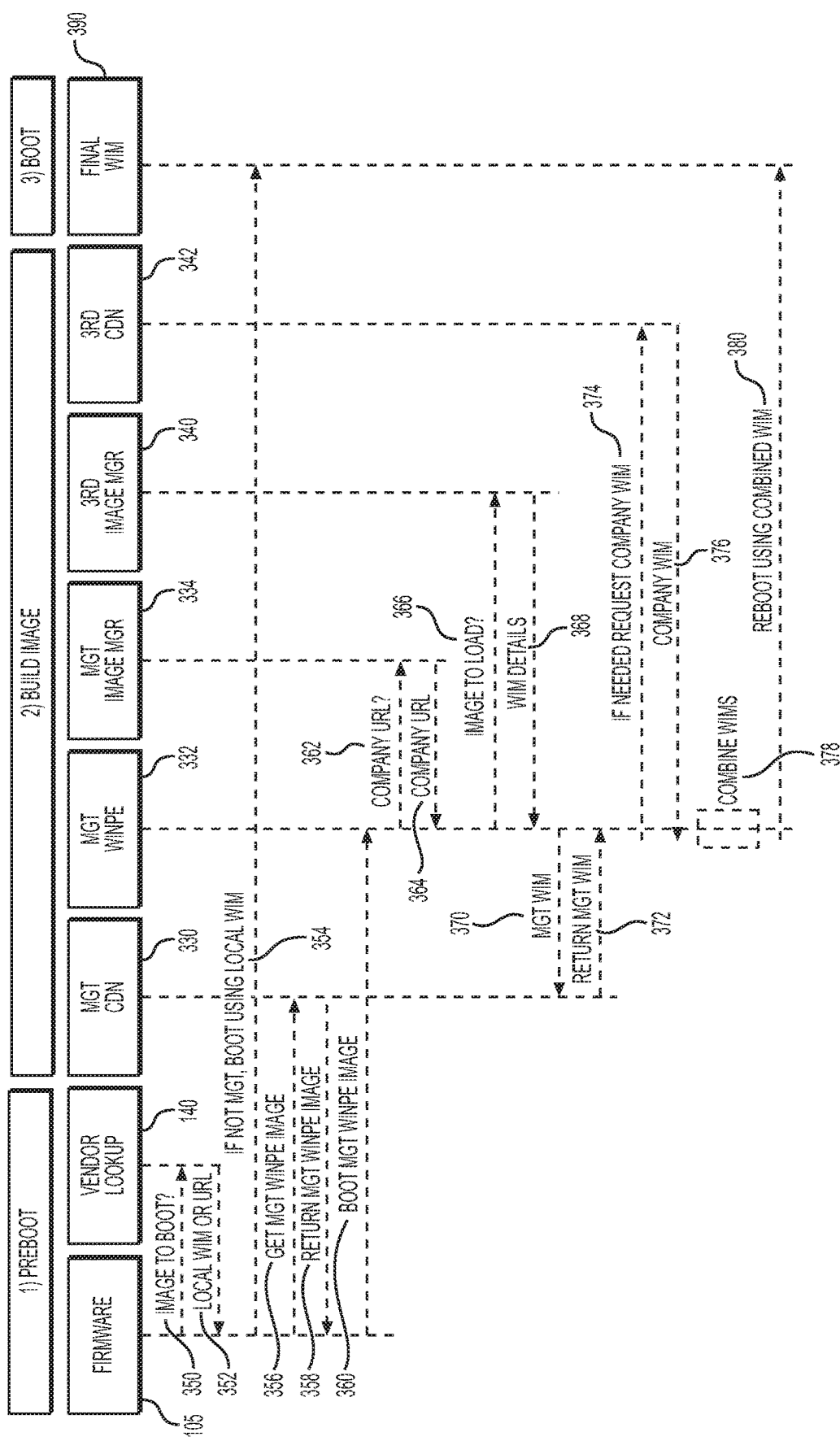
FIG. 3 a flowchart of an exemplary method for assembling an OS image for initial boot or Internet recovery.

FIG. 3 includes exemplary stages for assembling an OS image for initial operating system boot. The assembled OS image can include a management agent 132 that enforces managed policies 134.

FIG. 3 includes stages relating to pre-boot, building an image, and booting the assembled OS image. The stages of FIG. 3 can be performed when an OS 111 does not boot correctly, is the wrong version, or simply does not exist on the computing device 110. Therefore, the stages can be performed to assemble an OS 111 according to a stored configuration for the computing device 110. This can be done on initial boot or in an Internet recovery context. To assemble the OS 111, the computing device 110 can download OS images from one or more servers 130, 140, 340. The OS images downloaded can depend on the ownership information for the device, which can include hardware configuration information.

At stage 350, the firmware 105 (such as flag 112) can cause the computing device 110 to contact a server 130, 140 to request device ownership information. Instead of relying on networking from an OS 111, the firmware 105 can provide its own networking stack. This allows the computing device 110 to determine whether it is managed and which company it belongs to before WINDOWS begins to load.

In the example of FIG. 3, the computing device queries a vendor server 140. The vendor server 140 can determine management status based on a device identifier in the request.

At stage 352, the vendor server 140 can supply an address, such as a URL. The URL can point to a pre-enrollment installer 332, referred to in FIG. 3 as "MGT WINPE." The pre-enrollment installer 332 can act as a mini operating system for gathering one or more OS images. The pre-enrollment installer 332 can be a WINDOWS pre-enrollment image.

If the computing device 110 is not managed, the vendor server 140 can also specify an OS image to load, in an example. If the computing device 110 has a local image of the specified OS, it loads it as the final OS image 390. Alternatively, the computing device 110 can download the OS image from an address specified by the vendor server 140. In FIG. 3, the final OS image is referred to as "Final WIM," which is a WINDOWS image. At stage 354 the computing device 110 boots using the Final WIM 390.

If the computing device 110 is managed, then at stage 356 the computing device 110 downloads a pre-enrollment installer 332 at stages 356 and 358. The pre-enrollment installer 332 can be a mini operating system for use in a pre-boot environment. Based on the ownership information, the vendor server 140 can provide an address of a managed content delivery network ("MGT CDN") 330. The MGT CDN 330 can be part of a management server 130. Using credentials supplied by the vendor server 140, the computing device 110 can contact the MGT CDN 330 at stage 356. It can then download the pre-enrollment installer ("WINPE") 332 at stage 358.

At stage 360, the pre-enrollment installer 332 is executed. The pre-enrollment installer 332 can run independently of an operating system 111, such as WINDOWS. So even when the computing device 110 does not have an uncorrupted OS image 129, the pre-enrollment installer 332 can execute, in an example. In that example, instead of relying on the OS 111 for networking, the pre-enrollment installer 332 can continue to use the networking stack provided in the firmware 105. This allows the stages to continue operation before WINDOWS begins to load.

At stage 362, the pre-enrollment installer 332 can connect to a discovery service to determine ownership information for the computing device. The discovery service can be part of the management server 130 in one example. In this example, the pre-enrollment installer 332 contacts the management image manager ("MGT Image MGR") 334, which can be part of the management server 130. The management server 130 can track which tenant the managed device is associated with. It can also track one or more servers to consult for constructing a clean and configured OS for the device and tenant. Other discovery services are also possible.

At stage 364, the management server 130 (MGT Image MGR 334 or other discovery service) can return a response indicating a tenant that owns the computing device 110 and an address (such as a URL) to use for querying the tenant. Specifically, the address can be used to query the tenant regarding OS image details, which can be used to determine which OS images to install. As an example, the tenant can have requirements for the OS, the MDM system version, and particular managed applications 136. Any of these can be OS image details that ultimately are used to locate the correct OS image. In another example, the OS image details can specifically identify one or more OS images by file name.

In another example (not illustrated in FIG. 3), the discovery service can store the OS image details locally, obviating the need to query the tenant. For example, the management server 130 can track the OS image details for various tenants. This can allow the management server 130 to also provide the OS image that meets the requirements of the OS image details.

At stage 366, the pre-enrollment installer 332 contacts a first company server using an address supplied by the management server 130 from stage 364. In this example, the first company server is a third party image manager ("3RD Image MGR") 340 that was identified by the management server 130 based on ownership information for the computing device 110. The management server 130 and third party image manager can also be a single server. The first company server 340 can return OS image details at stage 368. For example, the OS image details can include an OS version to install, a version of the management agent 132, and a collection of applications 136 that should be installed.

Using this information, at stage 370, the pre-enrollment installer 332 can contact the MGT CDN 330, which can be part of the management server 130. The MGT CDN 332 can identify one or more OS images that satisfy the requirements of the OS image details. In one example, a single OS image can be retrieved. However, in another example, a management OS image that includes the correct management agent 132 and policies 134 can be selected. A second OS image with a file system for the correct OS version can be selected. Additionally, an application OS image with files for installing or executing the correct set of applications 136 can also be selected. Finally, a driver image can be selected to support the hardware configuration of the computing device 110. The management server 130 can return the one or more images to the computing device 110 at stage 372.

In one example, the OS image details can also include one or more addresses for downloading the tenant's OS images. The addresses, for example, can specify a location other than the MGT CDN 332. For example, these can apply to software that is not managed by the management server 130. The tenant's OS images can be self-hosted at the company server in one example. Alternatively, the management server or another third party server can host the OS images. The tenant OS images can be combined with a management OS image that includes the management agent. Together, the tenant OS images and management OS image can make up a complete OS image that includes management functionality needed by the management server 130.

In this example, at stage 374, the pre-enrollment installer 332 can contact a tenant's or third party's CDN 342. CDN 342 can be a company server. This server can be outside of the management server's 130 control. In one example, the tenant's or third party's CDN 342 can provide one or more OS images back to the pre-enrollment installer 332 at stage 376. Additional servers can also supply additional OS images.

In another example, the company server 342 can return OS image details. The OS image details can specify specific OS images to install, such as "BigWare.wim." If the required OS images do not exist on the computing device 110, the pre-enrollment installer 332 can proceed to download the compliant OS images, such as from the management server's CDN 330. Alternatively, the OS image details can include parameters around which the management server 130 or pre-enrollment installer 332 can select compliant OS images. For example, the parameters can specify an OS version, an MDM system version, and particular applications for installation. One possible parameter would be for the most recent OS and MDM versions.

A management OS image file, such as AIRWATCH.WIM, can also be downloaded to allow the device to function properly in an MDM system. This can be downloaded from the management server 130 in one example. The management OS image file can include the management agent 132. This can allow the OS to enroll with the management server 130 and implement management policies 134 on the computing device 110. The management OS image file can be part of the overall OS, meant for combining with other OS images. Alternatively, it can be the entire OS image file.

At any of the stages, the pre-enrollment installer 332 can also check a local drive 126 for OS images before attempting to download them. If the correct OS image already exists locally, such as in hidden partition 128, the pre-enrollment installer 332 can use the local OS image.

At stage 378, the pre-enrollment installer 332 can combine the various OS images that are downloaded or otherwise located over the preceding stages. Once all the required OS images are downloaded, the firmware 105 can extract the images to a local storage partition. This can include the management OS image, which can be overlaid onto the final extracted image. This can include splicing or injecting the image over the top of a WINDOWS base installation image.

At stage 380, the pre-enrollment installer 332 or firmware 105 can reboot the machine, leading to normal WINDOWS setup and device enrollment. The enrollment components can take effect during normal WINDOWS installation, causing the appropriate management policies to be downloaded and enforced on the computing device.

Figure 4:
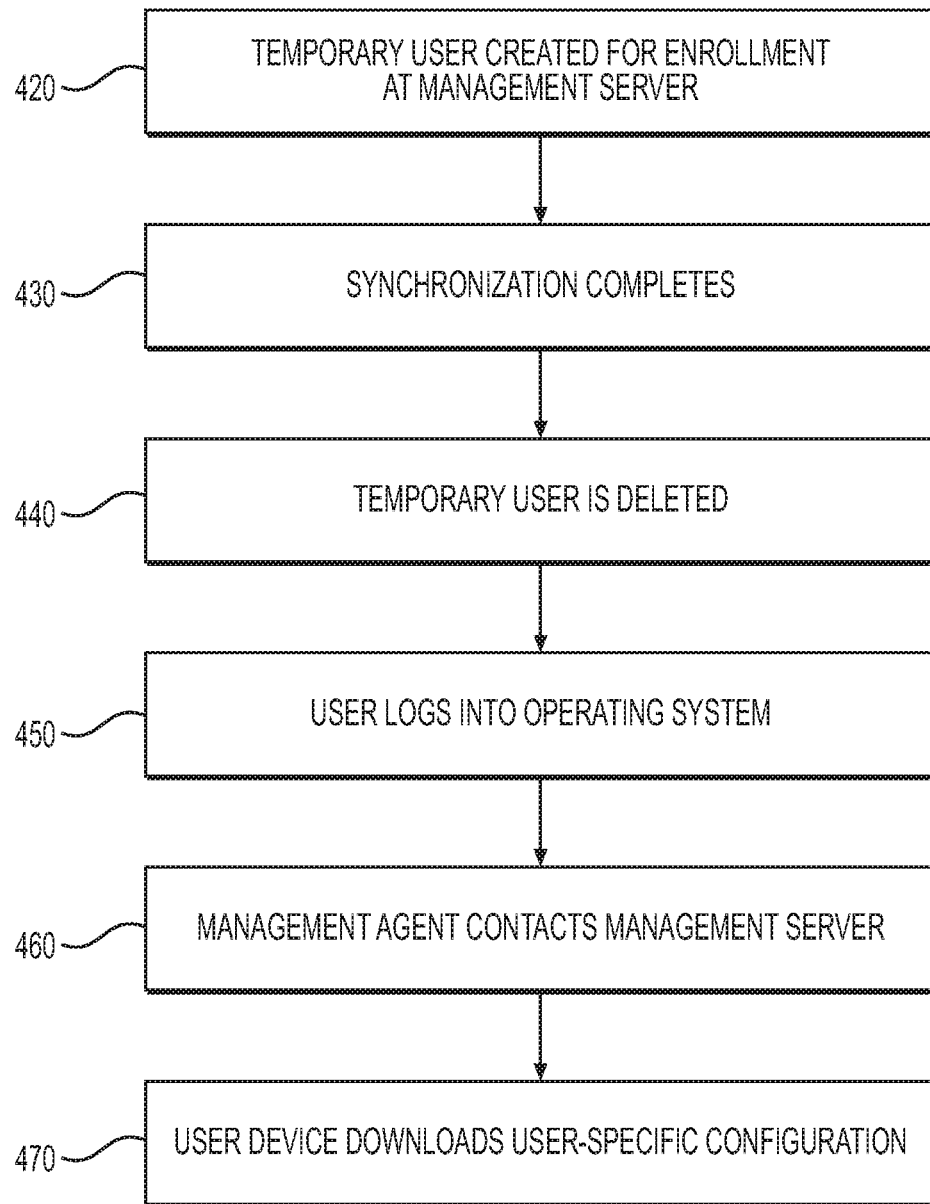
FIG. 4 is a flowchart of an exemplary method for preventing a user from logging into an operating system while enrollment takes place.

FIG. 4 illustrates exemplary stages for using a temporary user account during enrollment. A temporary user account can be created to provide the user with visual enrollment feedback, and to facilitate the enrollment of the computing device 110, which has not had users assigned to it yet during the initial boot.

At stage 420, a temporary user account is created. In one example, the enroller 138 executes as a Local System user in WINDOWS. The temporary user account can be created, for example, in an XML file that WINDOWS executes during normal setup. The XML, file can be created by the enroller 138. The enroller 138 can be updated from the management server 130 to prevent hijacking of access credentials from the firmware 105. The account name can be anything that the enroller 138 writes to the XML file. The temporary user does not need administrative rights to be used in the enrollment process with the management server 130. In one example, the password is a complex password automatically generated by OOBE, which is an audit mode for booting WINDOWS. It can be stored temporarily in the registry and deleted once the user logs into WINDOWS.

The enroller 138 can wait for enrollment synchronization to complete. During this time, the enroller 138 can create a graphical interface that provides feedback to the user indicating enrollment is occurring.

At stage 430, synchronization and initial enrollment completes. The enroller 138 or management agent 132 can delete the temporary user at stage 440, including deleting the password from the registry. This can prevent a user from discovering the temporary user credentials in an attempt to circumvent the pre-boot enrollment. Additionally, the enroller 138 can remove the user interface since enrollment is no longer occurring. Any other logs or other files can also be deleted to leave the newly-booted operating system 111 in a clean state.

The enroller 138 can un-pause WINDOWS boot. Once the boot is complete, enroller 138 can delete itself.

At stage 450, the user logs into WINDOWS. The management agent 132 can detect the login and capture user information, including the user name.

At stage 460, the management agent 132 can contact the management server 130 to update the enrollment association to the newly discovered user. The management server 130 can transfer the WINDOWS enrollment from the temporary user to the new user. If the temporary user is not already removed, the management agent 132 can remove it.

At stage 470, updated policy information 134 based on the actual user can download and synchronize at the computing device 110.

Figure 5A:
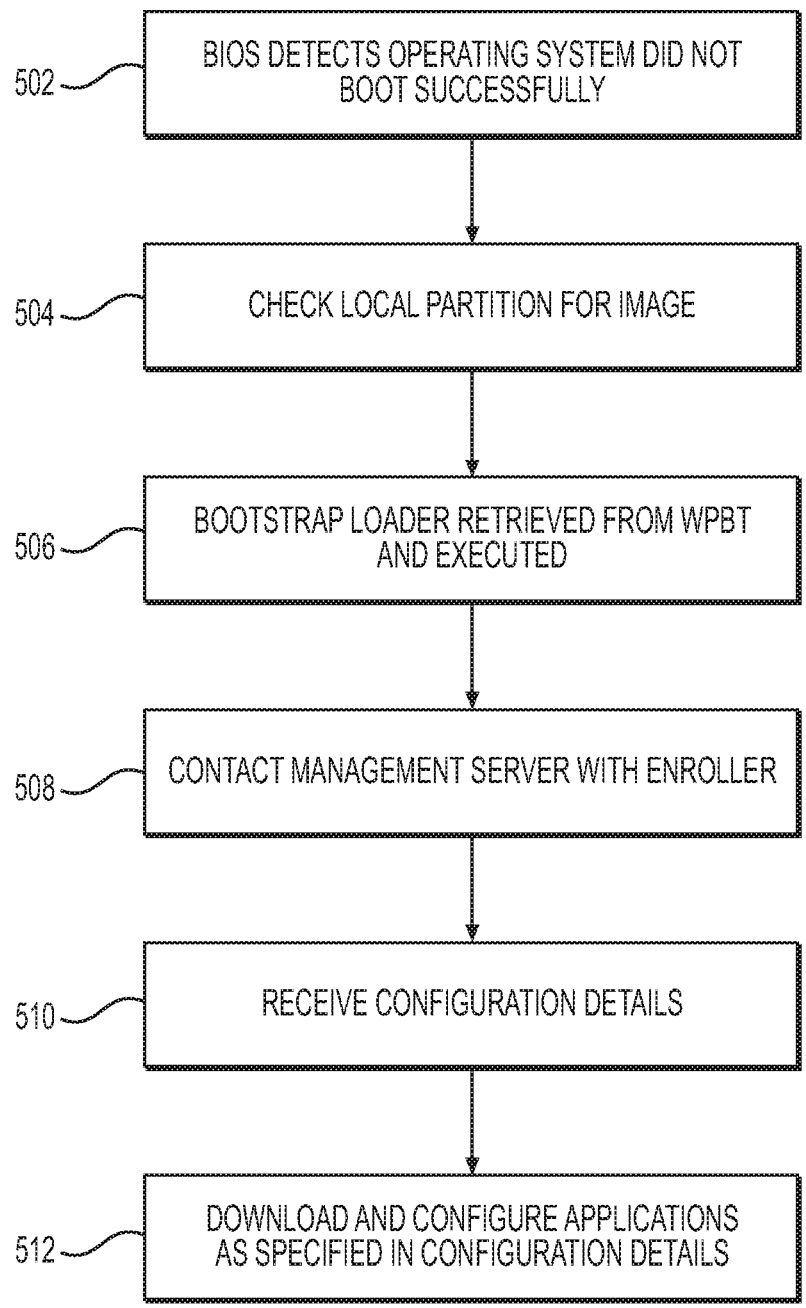
FIG. 5A is flowchart of an exemplary method for recovering a trusted image over a network.
Figure 5B:
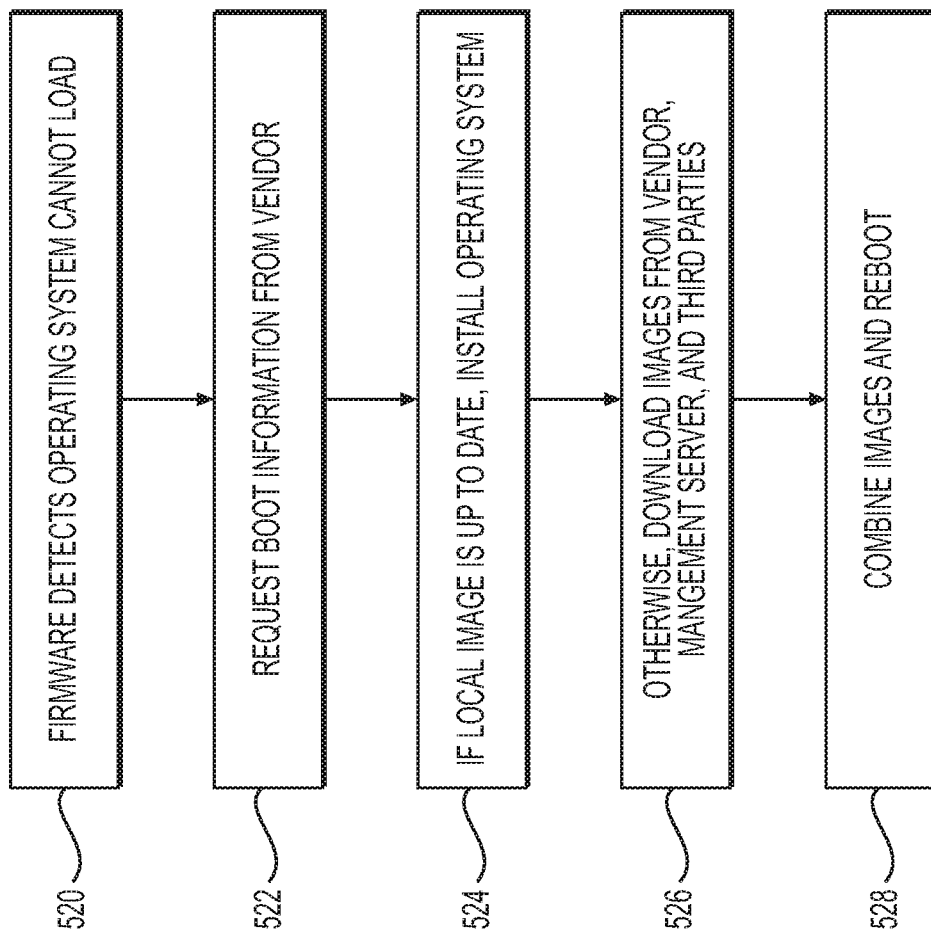
FIG. 5B is flowchart of an exemplary method for remotely managing BIOS settings of a user device.

FIGS. 5A and 5B include stages for Internet recovery when a device is corrupted or OS files are deleted. In one example, the BIOS 105 can rebuild the user device. A firmware 105 process, such as the bootstrap loader 115 or flag 112 can initiate a connection to a server 130, 140 to discover or download what it needs for a full restore. The process can be carried out by the enroller 138 or pre-enrollment installer.

Turning to FIG. 5A, at stage 502 the BIOS 105 can detect that the operating system 111 did not boot successfully. This can be because there is no operating system 111 present or because one or more binaries did not execute.

At stage 504, the BIOS 105 can check a local hidden partition 128 for an OS image 129. The OS image can begin booting. Otherwise, the BIOS 105 can contact a server 130, 140 defined in the firmware to download a copy of WINDOWS using a network stack in the firmware 105.

At stage 506, the bootstrap loader 115 can execute and wait for the Win32 Subsystem API to become available. Once Win32 is available and the network interface is active, the computing device 110 can execute an enroller 138 and contact a vendor server 140 specified in the firmware 105. The vendor server 140 can notify the enroller 138 of the computing device's 110 management status.

If it is a managed device, at stage 508 the enroller can contact the management server 130 at an address received from the vendor server 140. The management server 130 can then enroll the computing device 110.

At stages 510 and 512, the management server 130 can also point the enroller to other servers for downloading applications 160 and drivers 150 consistent with a stored configuration for the computing device 110. In one example, the management server 130 provides the address of a company server associated with the owner of the computing device 110. The company server can dictate which apps 160 and drivers 150 to download. Alternatively, some applications 136 can be provided by the management server 130.

The applications 160 and drivers 150 can be provided as part of an OS image in an example. Alternatively, they can be retrieved and installed after an OS image begins booting.

This can allow computing device 110 to recover their trusted image and settings by downloading them from a trusted source using the Internet.

Turning to FIG. 5B, an alternate method of Internet recovery is presented. At stage 520, the firmware 105 detects that an operating system 111 cannot load or does not exist.

At stage 522, firmware 105 can request boot information from a server 130, 140. The firmware 105 can contain the server 130, 140 location and execute a network stack to connect.

At stage 524, the server 130, 140 can return information identifying a local OS image 129 or an address to contact. If the local OS image 129 exists, the system can reboot using the local OS image 129.

Otherwise, as stage 526, the computing device 110 can download a pre-enrollment installer from the management server 130. The management server 130 or other server can provide the pre-enrollment installer 332 with addresses for downloading OS images from one or more of the vendor server 140, management server 130, and third parties, such as a company server.

At stage 528, the pre-enrollment installer 332 can combine the OS images for use on a reboot. Once all the required OS images are downloaded, the firmware 105 can extract the images to a local storage partition. This can include the management OS image, which can be overlaid onto the final extracted image. This can include splicing or injecting the image over the top of a WINDOWS base installation image.

Then, the pre-enrollment installer 332 or firmware 105 can reboot the machine, leading to normal WINDOWS setup and device enrollment. The enrollment components can take effect during normal WINDOWS installation, causing the appropriate management policies to be downloaded and enforced on the computing device.

Figure 6A:
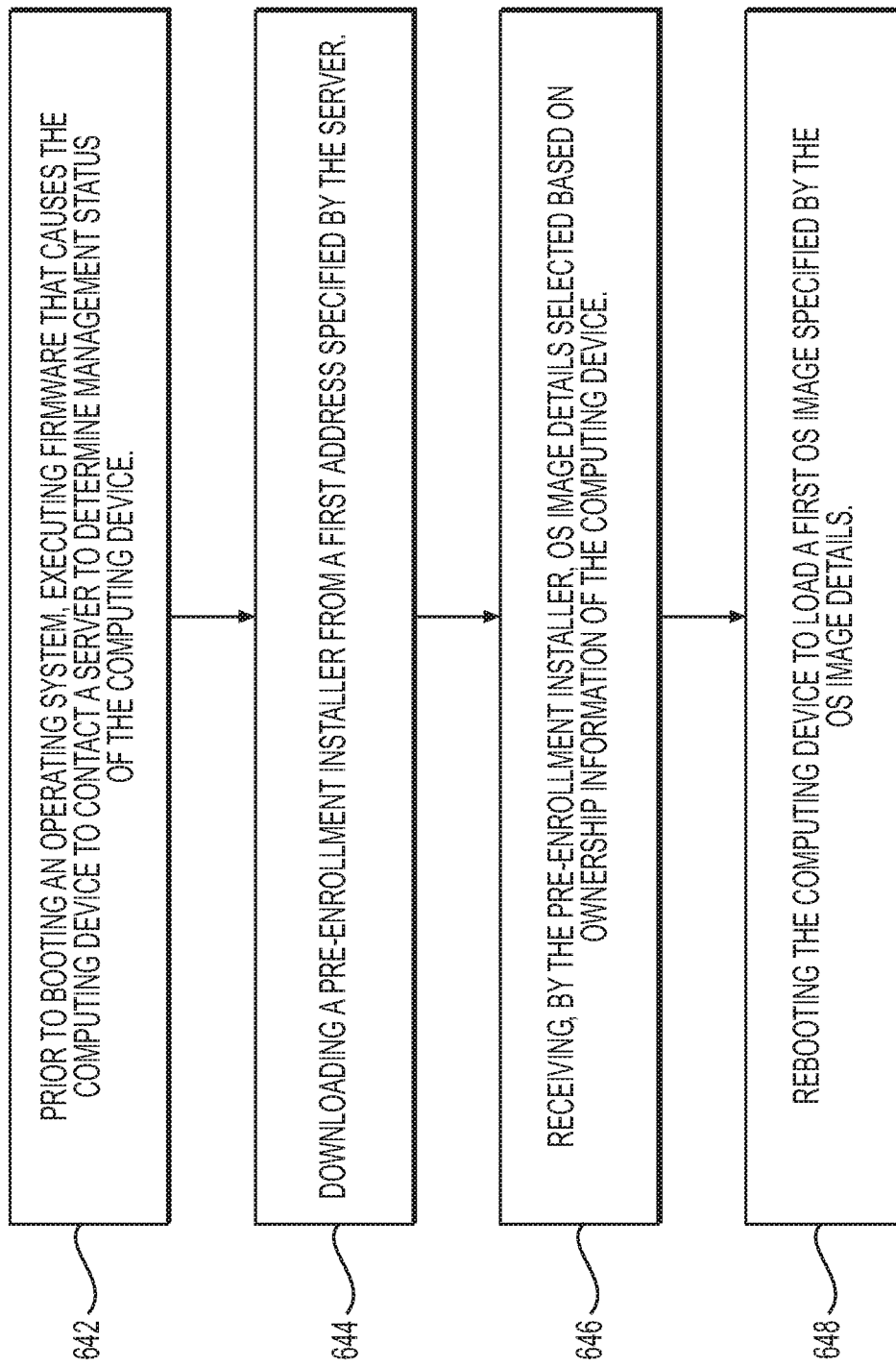
FIG. 6A is flowchart of an exemplary method for assembling an OS image.

Turning to FIG. 6A, an exemplary method for assembling a managed operating system is presented. At stage 642, prior to booting an operating system 129, the computing device 110 executes firmware 105 that causes the computing device 110 to contact a server 130 or 140 to determine management status. This can be based on a flag 112 or any other example already discussed. It can occur prior to WINDOWS beginning to boot, and can even occur when no resident OS exists. The computing device can rely on a network stack in firmware to drive the network interface 122 and contact the server 130 or 140.

If the computing device 110 is managed, at stage 644 it can downloading a pre-enrollment installer from a first address specified by the server 130 or 140. The first address can be associated with the server 130 or 140, or with a different server.

At stage 646, the computing device 110 can receive OS image details. These can be selected by the server 130 or 140 based on ownership information of the computing device 110. The OS image details can list one or more OS images to download. The OS image details can also include connection credentials for contacting CDNs. Alternatively, parameters can be provided, such as minimum OS version, MDM version, and others. The computing device 110 can download one or more OS images from multiple locations, including a management OS image.

At stage 648, the computing device can reboot to load at least a first OS image specified by the OS image details. A specified OS image would be any image identified, described, or meeting parameters in the OS image details.

Figure 6B:
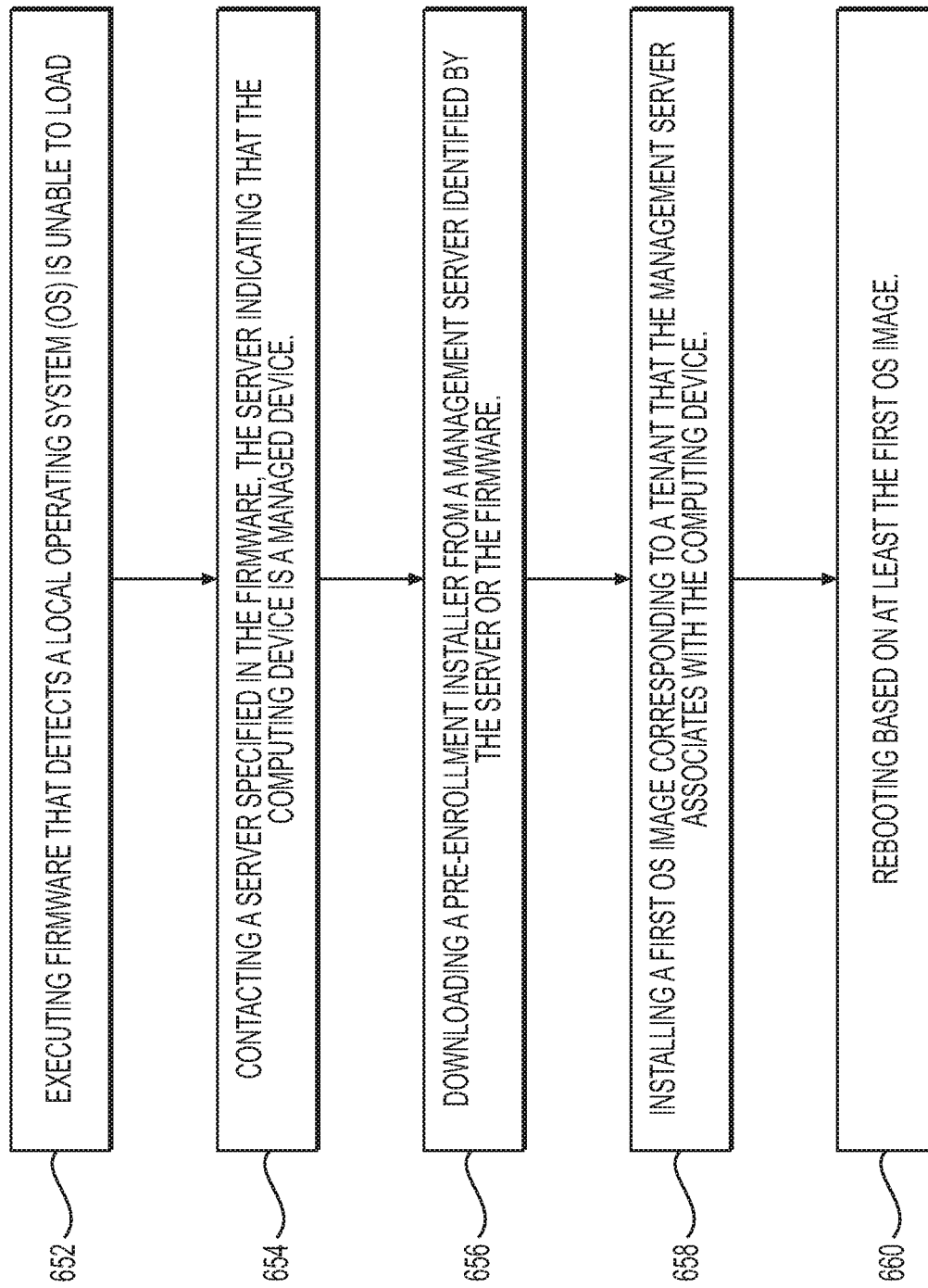
FIG. 6B is flowchart of an exemplary method for Internet recovery.

Turning to FIG. 6B, an exemplary method for Internet recovery is presented. At stage 652, the computing device executes firmware that detects an operating system (OS) is unable to load. The OS could be corrupted, incompatible, or might not even exist on the computing device 110.

The firmware can attempt to recover a bootable OS from a server 130, 140. At stage 654, the computing device contacts a server 130, 140 specified in the firmware 105. This can include utilizing a firmware stack to contact the server 130, 140. The server 130, 140 can return an indication that the computing device 110 is a managed device.

In another example, the firmware 105 locates an OS image 129 in a hidden partition 128. The firmware 105 can begin booting this OS image 129, allowing the bootstrap loader 115 to launch the enroller 138, which can contact the server 130, 140 at stage 654.

At stage 656, the computing device 110 downloads a pre-enrollment installer from a management server 130. The management server 130 can be identified to the computing device by the server 130 or 140 or the firmware 105. The pre-enrollment installer can act as a mini-operating system for gathering one or more OS images. A single OS image can be loaded as the OS. Alternatively, multiple partial OS images can be combined together to form a comple OS image. The pre-enrollment installer itself can be a WINDOWS pre-enrollment image.

At stage 658, the computing device 110 can install a first OS image. The first OS image can be selected by the management server 130 based on ownership information 142 of the computing device 110. For example, different tenants (e.g., owners or groups) can be configured to execute different OS images, depending on the version of the OS, management settings, an application suites. For example, a first company can use different software than a second company. The different respective software can be included on the different respective OS images. As another example, a development group can utilize various programming-related applications, whereas a sales group can utilize sales-tracking applications. These groups can be different tenants with different respective OS images that contain the correct applications for each group.

At stage 660, the computing device can reboot based on at least the first OS image. The first OS image can be independently loaded in an example. Alternatively, it can be combined with one or more other OS images. For example, the management server 130 can supply a management OS image with management functionality. A company server can specify or supply a second OS image with a tenant-specific software suite. A third-party hardware company can supply drivers for hardware that exists on the computing device 110. These OS images can be combined into a combined OS image that is booted by the computing device 110. This can include rebooting the computing device 110 to load the combined OS image. In one example, the various OS images include code that is injected into a skeleton OS image that has placeholders for different parts of the overall combined OS. This can allow constant updating and customization of management agents 132, policies 134, drivers 150, and applications 136 and 160 without needing to coordinate creation of a single new OS image each time.

Instead, only an OS image embodying the effected part of the combined OS need be updated.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

Although described in the context of an EMM system, the techniques for detecting and enforcing driving restrictions do not require an EMM system. The firmware bootstrapping techniques can also be carried out without a management server.

What is claimed is:

1. A computing device that performs Internet recovery, comprising:
   a non-transitory, computer-readable medium containing instructions; and
   at least one processor that executes the instructions to perform stages comprising:
     executing firmware that detects the computing device is unable to load an operating system (OS);
     based on detecting the computing device is unable to load the OS, contacting a server specified in the firmware, the server determining whether the computing device is to be a managed device;
     downloading a pre-enrollment installer from a management server, the management server being identified to the computing device by the server or the firmware;
     installing a first OS image selected by the management server based on ownership information of the computing device, wherein the pre-enrollment installer downloads the first OS image and the first OS image includes a management agent; and
     rebooting based on at least the first OS image, wherein the management agent enrolls the computing device in a device management system during reboot, wherein the enrollment is performed using temporary credentials that are deleted by the management agent after the enrollment is complete.

2. The computing device of claim 1, the stages further comprising:
   receiving, from the management server, a first address associated with a tenant server; and
   receiving OS information regarding the first OS image from the tenant server, wherein the pre-enrollment installer downloads the first OS image using the OS information.

3. The computing device of claim 2, wherein the OS information identifies a version of an operating system.

4. The computing device of claim 1, the stages further comprising downloading a second OS image from the management server that includes a management agent, wherein rebooting is based on the first and second OS images.

5. The computing device of claim 4, wherein the second OS image is selected based on a version of the first OS image.

6. The computing device of claim 4, wherein rebooting causes the computing device to contact the management server to complete an enrollment process.

7. The computing device of claim 4, wherein the first and second OS images are WINDOWS OS images.

8. The computing device of claim 1, the stages further comprising locating the first OS image in a hidden partition of the computing device.

9. A method for Internet recovery of a computing device, comprising:
   executing firmware that detects the computing device is unable to load an operating system (OS);
   based on detecting the computing device is unable to load the OS, contacting a server specified in the firmware, the server determining whether the computing device is to be a managed device;
   downloading a pre-enrollment installer from a management server identified by the server or the firmware;
   installing a first OS image selected by the management server based on ownership information of the computing device, wherein the pre-enrollment installer downloads the first OS image and the first OS image includes a management agent; and
   rebooting based on at least the first OS image, wherein the management agent enrolls the computing device in a device management system during reboot, wherein the enrollment is performed using temporary credentials that are deleted by the management agent after the enrollment is complete.

10. The method of claim 9, further comprising:
    receiving, from the management server, a first address associated with the ownership information; and
    receiving OS information regarding the first OS image from the first address, wherein the pre-enrollment installer downloads the first OS image using the OS information.

11. The method of claim 9, wherein the OS information identifies a version of an operating system.

12. The method of claim 9, further comprising downloading a second OS image from the management server that includes a management agent, wherein rebooting is based on the first and second OS images.

13. The method of claim 12, wherein the second OS image is selected based on a version of the first OS image.

14. The method of claim 12, wherein rebooting causes the computing device to contact the management server to complete an enrollment process.

15. The method of claim 12, wherein the first and second OS images are WINDOWS OS images.

16. The method of claim 9, further comprising locating the first OS image in a hidden partition of the computing device.

17. A non-transitory, computer-readable medium containing instructions for Internet recovery, the instructions being executed by a processor of a computing device to perform stages comprising:
    executing firmware that detects the computing device is unable to load an operating system (OS);
    based on detecting the computing device is unable to load the OS, contacting a server specified in the firmware, the server determining whether the computing device is to be a managed device;

downloading a pre-enrollment installer from a management server, the management server being identified to the computing device by the server or the firmware;

installing a first OS image selected by the management server based on ownership information of the computing device, wherein the pre-enrollment installer downloads the first OS image and the first OS image includes a management agent; and rebooting based on at least the first OS image, wherein the management agent enrolls the computing device in a device management system during reboot, wherein the enrollment is performed using temporary credentials that are deleted by the management agent after the enrollment is complete.

18. The non-transitory, computer-readable medium of claim 17, the stages further comprising:

receiving, from the management server, a first address associated with the ownership information; and receiving OS information regarding the first OS image from the first address, wherein the pre-enrollment installer downloads the first OS image using the OS information.

19. The non-transitory, computer-readable medium of claim 17, wherein the OS information identifies a version of an operating system.

20. The non-transitory, computer-readable medium of claim 17, the stages further comprising downloading a second OS image from the management server that includes a management agent, wherein rebooting is based on the first and second OS images.

\* \* \* \* \*